F. D. CARNEY & T. T. McENTEE.
AIR AND GAS PORT FOR OPEN HEARTH FURNACES.
APPLICATION FILED JUNE 15, 1908.
919,125.
Patented Apr. 20, 1909.
3 SHEETS—SHEET 1.
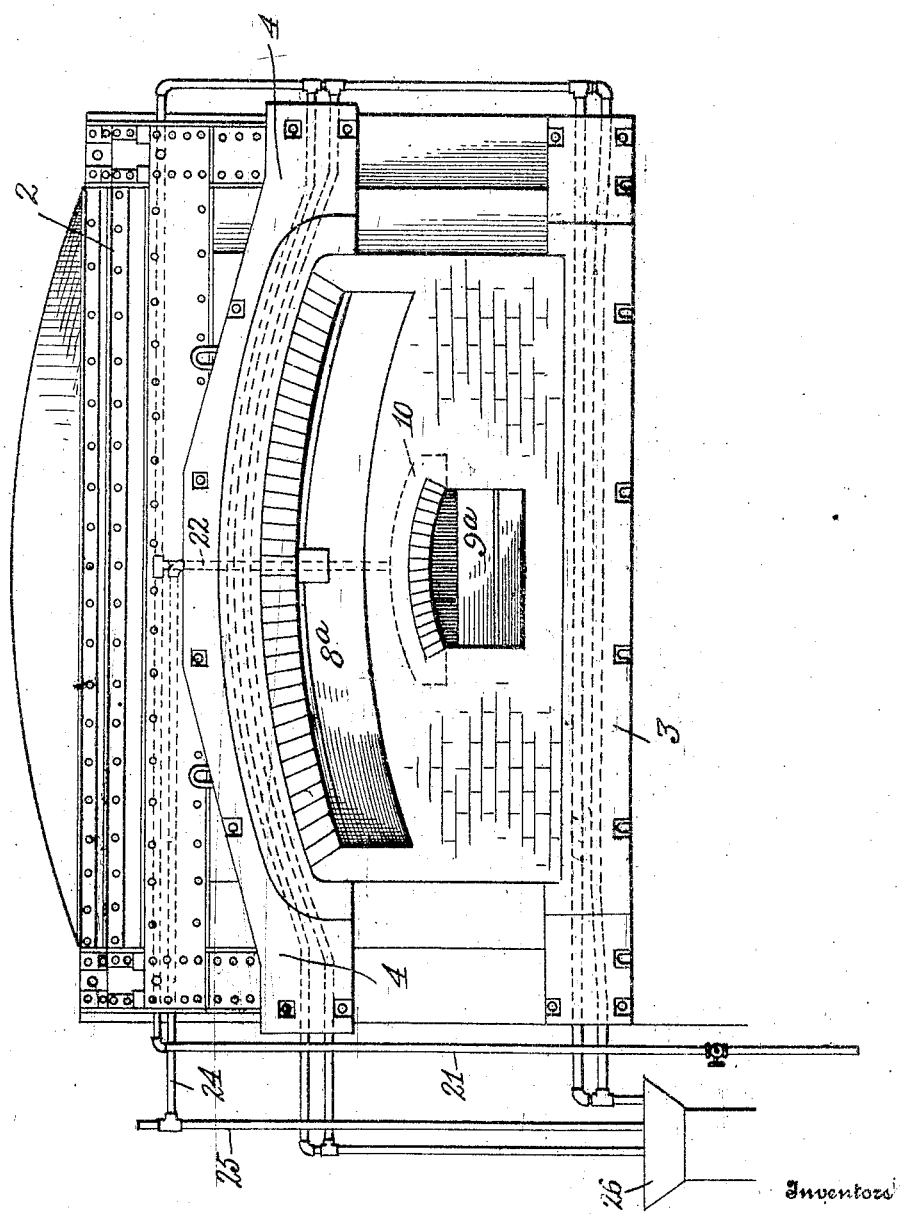

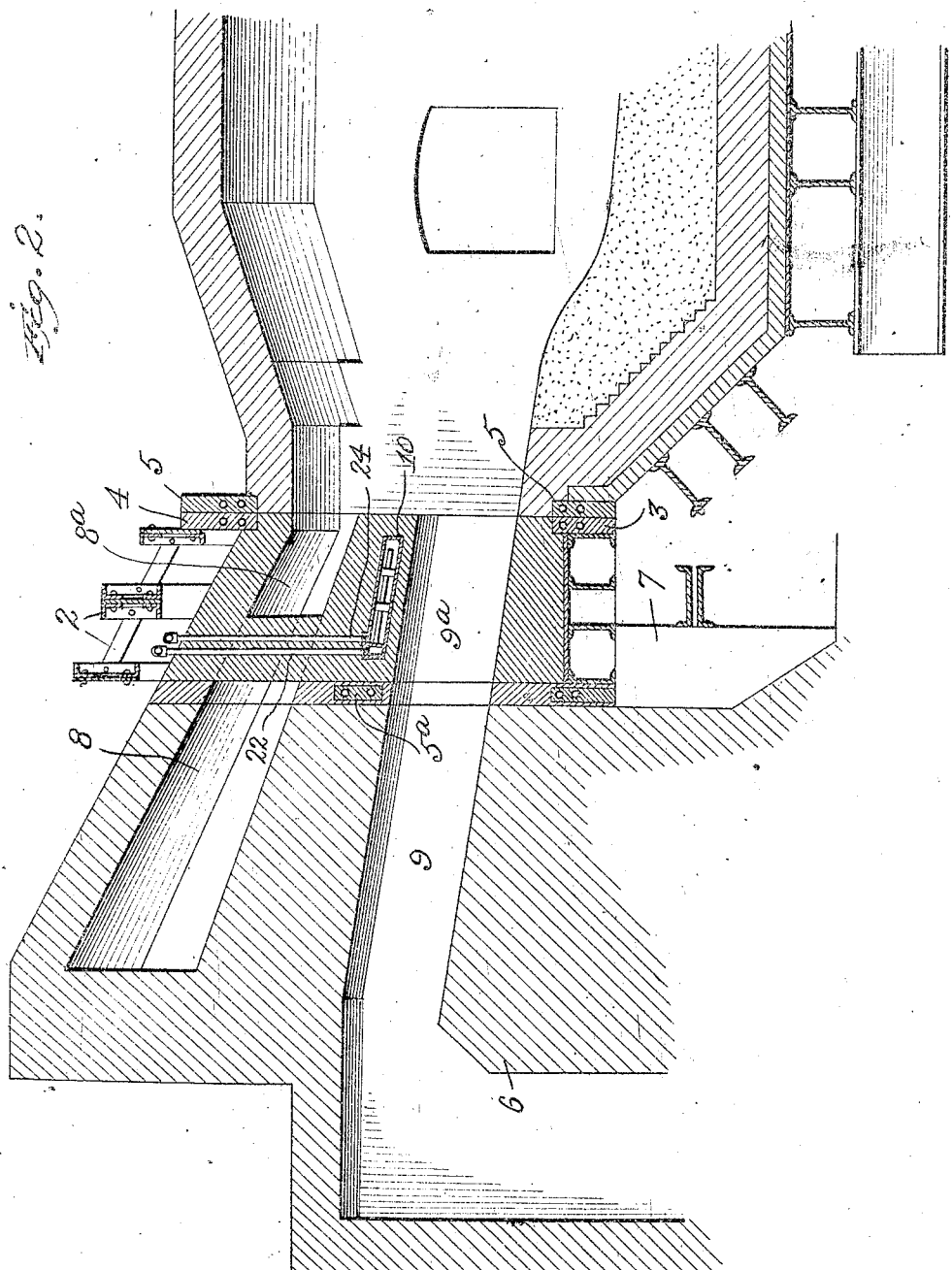

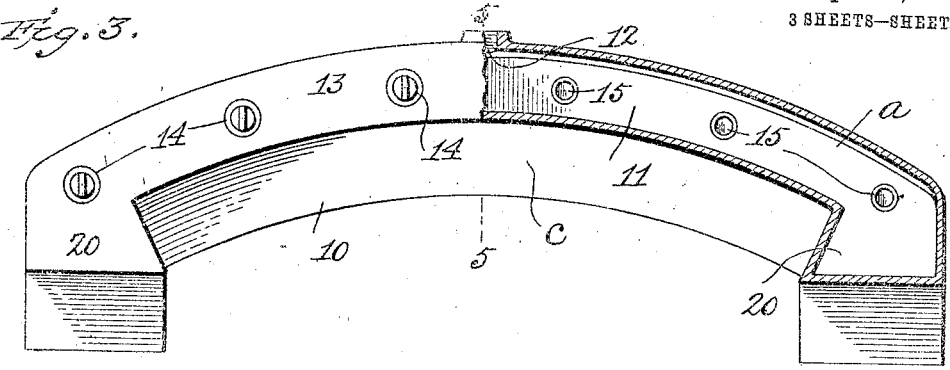
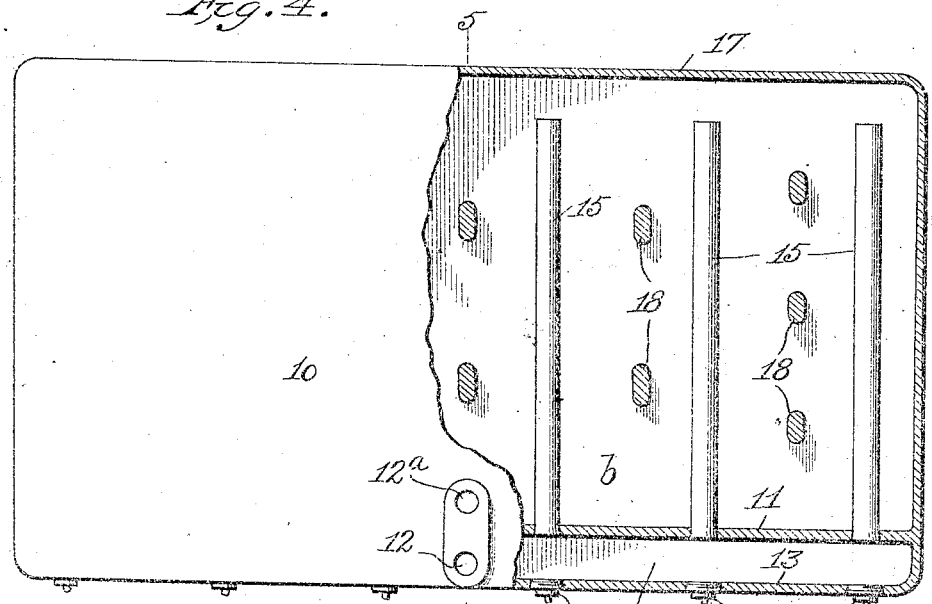
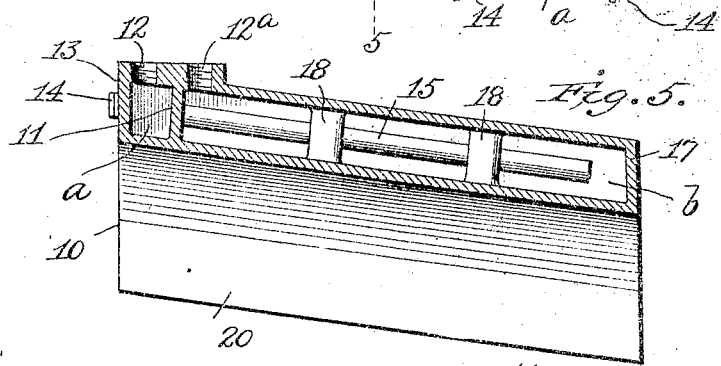

UNITED STATES PATENT OFFICE.

FRANK D. CARNEY AND THOMAS T. McENTEE, OF STEELTON, PENNSYLVANIA, ASSIGNORS, BY MESNE ASSIGNMENTS, TO KEYSTONE FURNACE CONSTRUCTION COMPANY, OF PITTSBURG, PENNSYLVANIA, A CORPORATION OF PENNSYLVANIA.

AIR AND GAS PORT FOR OPEN-HEARTH FURNACES.

No. 919,125.     Specification of Letters Patent.     Patented April 20, 1909.

Application filed June 15, 1908. Serial No. 438,594.

*To all whom it may concern:*

Be it known that we, FRANK D. CARNEY and THOMAS T. McENTEE, citizens of the United States, and residing at Steelton, Pennsylvania, have invented certain new and useful Improvements in Air and Gas Ports for Open-Hearth Furnaces; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to ports for open hearth furnaces and has for its object to cool those parts of the port or ports most liable to be fused.

During the operation of open hearth furnaces the most serious fusion of the refractory walls and partitions takes place at the partition between the air and gas ports, being the arch or partition over the mouth of the gas port of open hearth furnaces as constructed in accordance with the present open hearth furnace practice. This fusion is caused by the gases which pass over the molten bath through the gas and air ports to the heating chambers or regenerator chambers below the furnace. These gases entrain with them as a rule very fine particles of iron or iron oxid which act as a flux on the fire brick forming the mouth of the port and by the invention we materially increase the life of these ports and avoid the expensive and frequent changes customary in the operation of open hearth furnaces.

Referring to the drawings, in which like parts are similarly designated, Figure 1 is a front view of a removable port section showing the mouths of air and gas ports of an open hearth furnace. Fig. 2 is a longitudinal vertical section through the air and gas ports and a portion of an open hearth furnace showing our invention. Fig. 3 is a front view partly in vertical section of the cooling device. Fig. 4 is a plan thereof partly in horizontal section and Fig. 5 is a transverse section on the line 5—5 of Figs. 3 and 4.

According to the invention we make only the mouths of the ports removable, being preferably that portion immediately adjacent the furnace proper and which forms a vertical narrow section. The upper ends of the flues from the heating or regenerator chambers and a portion of the port-conduits leading therefrom to the furnace, being comparatively permanent, are built in a stationary structure 6 so that we provide a section removable from between the end of the furnace proper and said stationary structure 6 containing portions of the gas and air ports and ducts, said removable section embodying the parts most frequently requiring repairs, such as the mouth of the ports. To this end we form a frame 2 of structural metal within which we build the brick work and structure of refractory material to form continuations of the gas and air port conduits which are in the aforesaid stationary portions of the furnace and secure to the front of the frame 2 at the bottom, a cooling plate 3 and also a cooling plate 4 at the upper front face. The six inches space more or less intervening between the rear of the movable section and the stationary structure 6 after placing the former, is filled, up to the air port 8 by fire brick resting on cooling plate $5^a$. The frame 2 when in place rests on a suitable metallic or other support 7 with the cooling plates 3 and 4 abutting against stationary cooling plates 5 on the furnace proper.

8 is the air port and 9 the gas port conduit whose mouth portions $8^a$ and $9^a$ are within the removable section, and in the brick partition over that part of the gas port 9, being that partition that separates the air and gas ports, we place a cooling device 10. This cooling device is shown more fully in detail in Figs. 3, 4 and 5 and comprises a casting of bronze or other suitable metal internally divided into two chambers, a distributing chamber $a$ and a cooling chamber $b$, separated by a partition wall 11. The distributing chamber $a$ is preferably the smaller of the two, is farther from the furnace and is preferably provided with an inlet 12 opening into the distributing chamber, and an outlet $12^a$ at one side of the highest part of the cooling chamber. If it be desirable that cooling water may be supplied to the cooling device 10 at either end of the chamber $a$ the ends may be provided with openings for pipes. In the rear wall 13 of the cooler, being that wall farthest from the hearth, we provide a number of openings closed by plugs 14. Opposite these openings are tubes 15 secured into the partition 11 by suitably expanding the ends of the tubes or otherwise, said tubes being smaller than the plugs 14 in order that they may be secured in place through the holes closed by the removable plugs 14. These tubes 15 terminate near the front wall 17 of the cooler. Between the tubes are preferably, but not necessarily, provided supporting members 18 between the upper and lower walls and formed in the cooler when it is cast. Depending from the lower wall of the cooler are hollow extensions 20 formed as skewbacks at the ends of the arched portion c of the cooler. These skewbacks or extensions carry the arched brick lining forming the roof of the mouth of the gas port. The removable sections containing the mouths of the ports are interchangeable, and when water pipes are disconnected are lifted into and out of place by means of a suitable crane. Cooling water is supplied through a main pipe 21 over the top of the frame 2 and through a vertical pipe 22 through the brick work to the inlet opening in the cooler 10. Cooling water is also distributed by suitable connections to the cooling plates 3 and 4. This cooling water entering the cooler 10 passes into the smaller distributer chamber a and thence through the several tubes 15 is delivered to the forward and hottest end of the chamber b whence it flows to and issues through outlet 12$^a$ into a discharge pipe 24 passing vertically alongside pipe 22, thence over the top of the frame to an open ended vertical pipe 25, emptying into a funnel 26.

The entire cooler 10 is embedded in the partition between the mouths of the air and gas ports and adjacent walls and remains in its place during removal of the movable section.

We claim:

1. The combination with an open hearth furnace having an air flue above the gas flue; of a water cooler inclosed within the partition wall between the air and gas flues at their entrance to the furnace to cool the mouths or ports of said flues.

2. The combination with an open hearth furnace having air and gas flues; of a water cooler inclosed within the partition wall between the air and gas flues at their ports and situated nearer to the roof of the gas port than to the bottom of the air port.

3. The combination with an open hearth furnace having air and gas flues; of a suitably cooled arch supporter for the brick work forming the partition between the upper and lower ports and inclosed within the walls and partition separating the upper and lower ports at their mouth portions.

4. The combination with an open hearth furnace having stationary air and gas flues; of a removable port section containing the mouths of said flues and a water cooled member proximate the mouths of said flues and inclosed within the partition separating said flues.

5. The combination with an open hearth furnace having stationary air and gas flues; of a removable port section containing the mouths of the air and gas ports and a water cooled arch supporter within the wall and partition between the air and gas ports to support the roof of the gas port.

6. A cooler for the mouths of the air and gas ports of open hearth furnaces comprising a casing having a distributer chamber having one or more inlets for a cooling medium, a cooling chamber having one or more exits for cooling medium, said chambers separated by a partition, and distributer pipes mounted in the partition and discharging cooling medium from the distributer chamber near the end of the cooling chamber.

7. A cooler for the mouths of the air and gas ports of open hearth furnaces comprising a casing having an arched portion and divided into a distributer chamber having an inlet and a cooling chamber having an exit, a partition wall having openings therethrough dividing said chambers, openings in a wall of the distributer chamber, plugs normally closing said openings which are larger than the openings in the partition wall, and straight distributer pipes mounted in the openings in the partition wall to distribute cooling water near the front end of the cooling chamber.

8. A cooler for the mouths of the air and gas ports of open hearth furnaces comprising a casing having an arched portion between its sides, and arch supporting members at each end of the arched portion, a partition wall having openings therethrough dividing the interior of the casing into distributing and cooling chambers, one outer wall of the casing and distributing chamber having openings therein opposite those in the partition wall, plugs normally closing said openings, distributer pipes secured in the openings in the partition wall to distribute cooling water near the front of the cooling chamber, a water supply pipe entering the distributing chamber, and a discharge pipe for the cooling chamber.

9. A cooler for the mouths of the air and gas ports of open hearth furnaces comprising an arched casing having internal distributing and cooling chambers, the cooling chamber being separated from but communicating with the distributing chamber, and means to supply cooling water to the distributing chamber and having hollow extensions or skewbacks at the ends of the arched portion to support the roof of the gas port.

10. In a furnace of the character described having gas and air ports, an arch forming the separating wall between said ports, said arch having a water-cooled box or casting and a refractory lining or covering on both sides of the casting, substantially as described.

11. In a furnace of the type described, having adjacent gas and air ports separated by walls, hollow water-cooled plates or boxes inserted in the walls between said ports and removable through openings in the walls thereof, substantially as described.

12. In a furnace of the type described, having gas and air ports, an arch separating said ports, and hollow water-cooled boxes or plates extending into said arch; substantially as described.

In testimony that we claim the foregoing as our invention, we have signed our names in presence of two subscribing witnesses.

FRANK D. CARNEY.
THOMAS T. McENTEE

Witnesses:
GEO. W. PARSONS,
W. S. RUTHERFORD.